United States Patent [19]
Messner

[11] Patent Number: 6,056,365
[45] Date of Patent: May 2, 2000

[54] CENTER ARMREST WITH RESETTABLE OVERLOAD PROTECTION

[75] Inventor: Manfred Messner, München, Germany

[73] Assignee: F. S. Fehrer GmbH & Co. KG, Germany

[21] Appl. No.: 09/130,504

[22] Filed: Aug. 6, 1998

[30] Foreign Application Priority Data

Aug. 8, 1997 [DE] Germany .......................... 197 34 334

[51] Int. Cl.[7] .................................................. B60N 2/46
[52] U.S. Cl. .................................. 297/411.32; 297/216.1
[58] Field of Search .............................. 297/216.1, 411.2, 297/411.32, 411.44, 411.35, 411.38, 113

[56] References Cited

U.S. PATENT DOCUMENTS

| | | | |
|---|---|---|---|
| 5,033,792 | 7/1991 | Kanazawa | 297/411.32 |
| 5,114,212 | 5/1992 | Verney et al. | 297/411.44 X |
| 5,290,087 | 3/1994 | Spykerman | 297/411.32 X |

*Primary Examiner*—Peter R. Brown
*Attorney, Agent, or Firm*—McGlew & Tuttle, P.C.

[57] ABSTRACT

A center armrest with resettable overload protection. The center armrest is attached so as to be capable of pivoting via a bearing into the substantially horizontal position, protruding in the region of the backrest. A supporting frame is provided including a core. The supporting frame (2) may include at least two elements (2a, 2b) spaced from one another, between which an elastic linkage (5) is disposed.

12 Claims, 3 Drawing Sheets

CENTER ARMREST WITH RESETTABLE OVERLOAD PROTECTION

FIELD OF THE INVENTION

The invention relates to a center armrest with resettable overload protection, the armrest being attached so as to be capable of pivoting via a bearing into the substantially horizontal position, protruding in the region of the backrest, the backrest comprising a supporting frame by way of a core.

BACKGROUND OF THE INVENTION

It is generally familiar to attach between the front and/or rear seats of motor cars in the region of the backrest a center armrest which via a bearing is capable of being folded out of the backrest substantially into the horizontal position, the fulcrum being constituted by a bearing. In the case of the cantilevered armrests which in the unfolded state are supported merely in the bearing, said armrests being characterized as protruding, problems arise in practice as a result of the fact that, in the event of loads amounting to 60–80 kg at the end remote from the fulcrum, torques of considerable magnitude arise which lead to deformations of the bearing or alternatively necessitate an appropriate dimensional design. Loads with forces of this nature arise in practice when, for example, a vehicle occupant turns towards the region located behind the backrest and supports himself on the center armrest. In this connection the torque to be supported by the bearing is of course the greater, the longer the center armrest. The frontal arrangement, opposite the bearing, of a cup-holder or of a head restraint which in the retracted state is used by a third person sitting in the center position brings about a lengthening of the center armrest in practice and hence an increase in the torque generated by loads having a certain force. The disadvantageous consequence of an overload is the permanent deformation of the bearing.

SUMMARY AND OBJECTS OF THE INVENTION

Proceeding from the above, the object of the invention is the further development of the attachment of center armrests of this type, to the effect that no permanent deformation of or damage to the bearings occurs in the case of overload. In accordance with the invention this object is achieved in that the supporting frame comprises at least two elements spaced from one another, between which an elastic linkage is disposed.

The basic idea of the invention consists in that measures are provided permitting the center armrest to give way in the case of overload. The solution consists in the fact that the supporting frame performs an evasive movement. Two cases are to be distinguished, however, namely those in which the evasive movement of the supporting frame is effected through the agency of an elastic linkage, so that upon termination of the load the supporting frame returns automatically to its initial position. The use of elastic linkages is necessary for this purpose. Independently of this, solutions are conceivable with which, when a certain load is attained, the pivoting movement of the supporting frame is enabled by opening a locking mechanism but resetting has to be effected by hand. Any friction coupling such as is known in the case of torque wrenches for limiting the torque exerted, and consequently in a case that is comparable in terms of structure and function, may be numbered among the group of interest in this case. A characteristic of this group is that the supporting frame is freed in its movement when the limiting value is attained.

Where use is made of an elastic linkage the return to the initial position is effected automatically—i.e., upon termination of the overload situation the original state arises without external assistance. To this end the supporting frame located in the center armrest is interrupted sectionally with respect to its longitudinal axis and is bridged there with the aid of an elastic linkage. In this connection the front surfaces that are to point towards one another pertaining to the two support frame elements need not bear against one another but are spaced in relation to one another, so that room is created for the pivoting movement of the two support-frame elements relative to one another. In this connection the elastic linkage can be produced by frontal insertion in the manner of a core or alternatively, by means of a sleeve for bridging the individual elements.

By way of elastic linkages all types of resilient materials such as leaf springs, spiral springs or machine springs enter into consideration, but also all plastics consisting of elastic material.

The point of application of the force that results in the overload may in principle come to be located over the entire free and protruding length of the center armrest. For this reason it proves useful to install the elastic linkage in the region of the backrest, more precisely behind the front surface of the backrest, that is to say in the immediate vicinity of the bearing. It is consequently not possible for forces to act on that element of the supporting frame which is disposed between elastic linkage and bearing, since in such a case the overload safety device provided is ineffectual.

In an alternative achieving the same object, giving-way is effected not by virtue of a linear section of the supporting frame but by virtue of a releasable locking mechanism which acts in the case of a center armrest that is unfolded substantially into the horizontal position. Upon the limiting value being exceeded, the locking mechanism opens and the center armrest moves unhindered as far as the most extreme position that is possible for spatial reasons as a result of the reconstruction.

In one design the stop is constituted by a peg which abuts an opposite surface. As a rule it is a question here of a peg that is moved in a guide. In the case of high loads the stop, which consists of elastic material, is deformed, so that the center armrest can move beyond the position limited (in the normal state) by the stop.

The critical difference from aforementioned solutions consists in the force-distance dependency. Where use is made of an elastic linkage, as a rule a linear relationship arises between the load and the deflection of the center armrest. In the case of the last-mentioned solutions, with increasing action of force at first no deflection beyond the stop position can be detected, in order when the limiting value of the locking mechanism is attained to execute a movement that is independent of the force acting. Common to both is the possible deflection of the center armrest beyond its stop point.

The critical objective of the specified solutions consists in providing a protection for the bearing that is necessary by reason of the pivoting capacity of the center armrest, so that use can be made of bearings that are of small dimensions and consequently cheaper, without there being any risk of permanent damage or deformation. In principle the proposed solutions are applicable to rigidly attached center armrests, but they are also applicable to those which can be taken out and inserted. The capacity to be taken out should open up the possibility, where the need arises, of creating an additional seat surface or stowage space. As is generally known, in the framework of the center armrest an opening is provided in which skis emanating from the luggage compartment and encroaching into the passenger compartment of the vehicle can be inserted, whereby a ski bag extending into the passenger compartment surrounds the skis in order to protect the passengers against dirt, injury and such like.

Further particulars, features and advantages of the invention can be inferred from the following descriptive part, in which embodiment examples of the invention are elucidated in more detail with reference to the drawing.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

DESCRIPTION OF THE PREFERRED EMBODIMENTS

Figure 1:
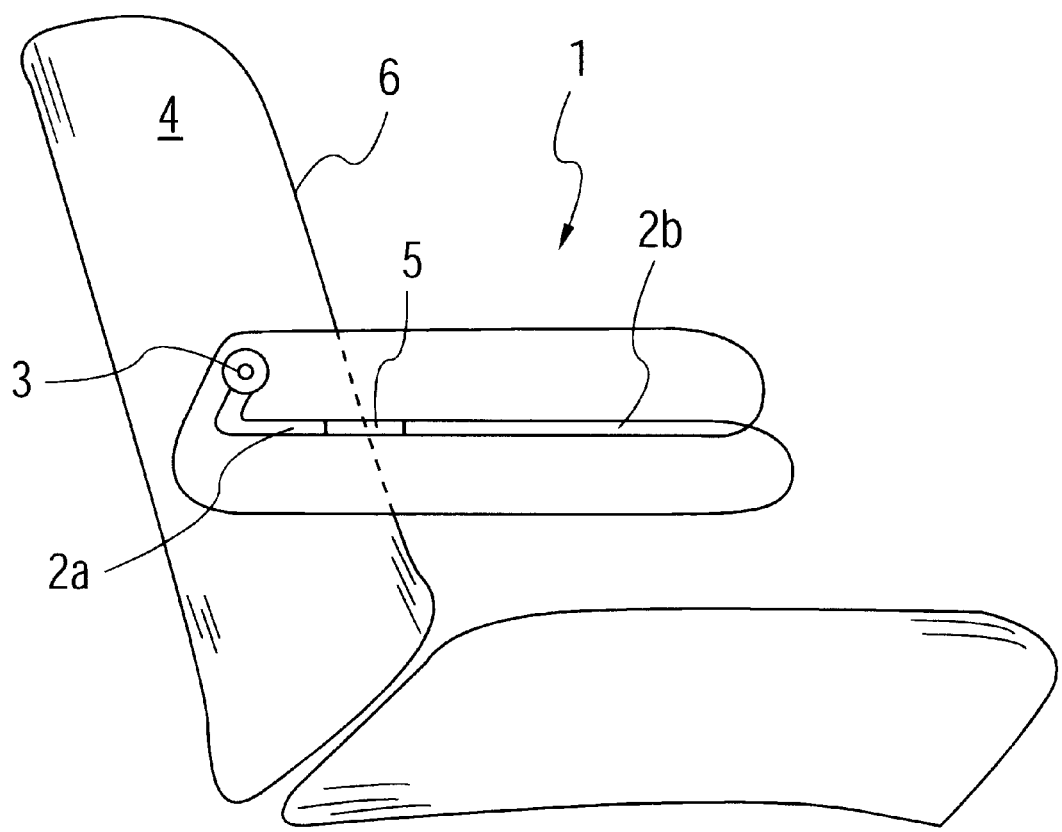
FIG. 1 is a schematic lateral view showing a first embodiment of the invention.

Referring to the drawings in particular, a center armrest generally designated 1 has an armrest body 1a and a supporting frame generally designated 2 in its core. This supporting frame 2 is attached so as to be capable of pivoting via a bearing 3 in the region of the backrest 4. The axis of the bearing 3 extends approximately in the horizontal direction, so that the supporting frame 2 can be brought from a position pointing substantially in the horizontal direction, corresponding to the state in which it is used, into a substantially vertical location and hence it disappears in the backrest 4. For the manufacture of the center armrest 1 the supporting frame 2 is surrounded by padding to form the armrest body 1a. The arrangement and function of such a center armrest are generally familiar from the known motor vehicles.

With a view to achieving the objective according to the invention, namely the avoidance of overloads of the bearing 3, two proposals are made, which can both be inferred from the drawing.

Figure 2:
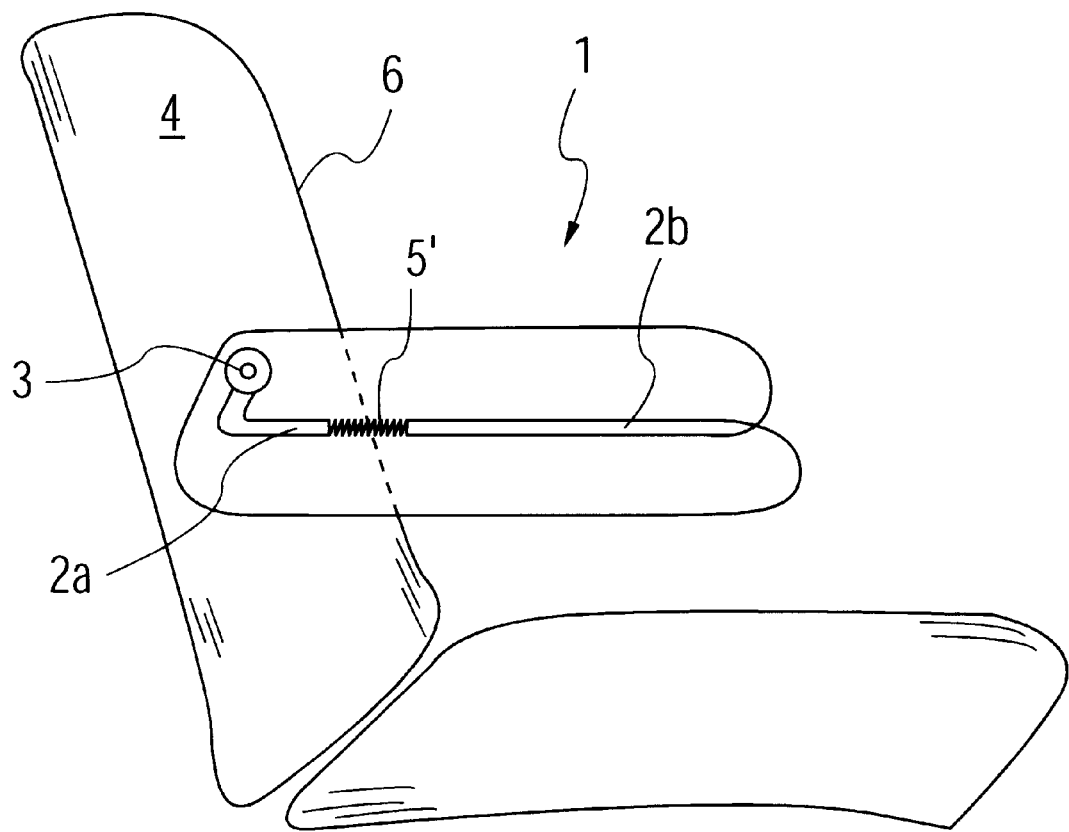
FIG. 2 is a schematic lateral view showing a first embodiment of the invention.

On the one hand, the supporting frame 2 is subdivided into two elements 2a, 2b which are spaced from one another and which are connected to one another via an elastic linkage 5 which is introduced between the two support-frame elements 2a, 2b in the manner of a core. This elastic linkage 5 is disposed in the region of the front surfaces 6 of the backrests 4, so that flexibility is ensured in the overload case, irrespective of the point of application of the force on the center armrest 1. The backrest 4 covers up the region close to the bearing 3, so that an action of force there is ruled out. The elastic linkage may be a spring element 5' as shown in FIG. 2.

Figure 3:
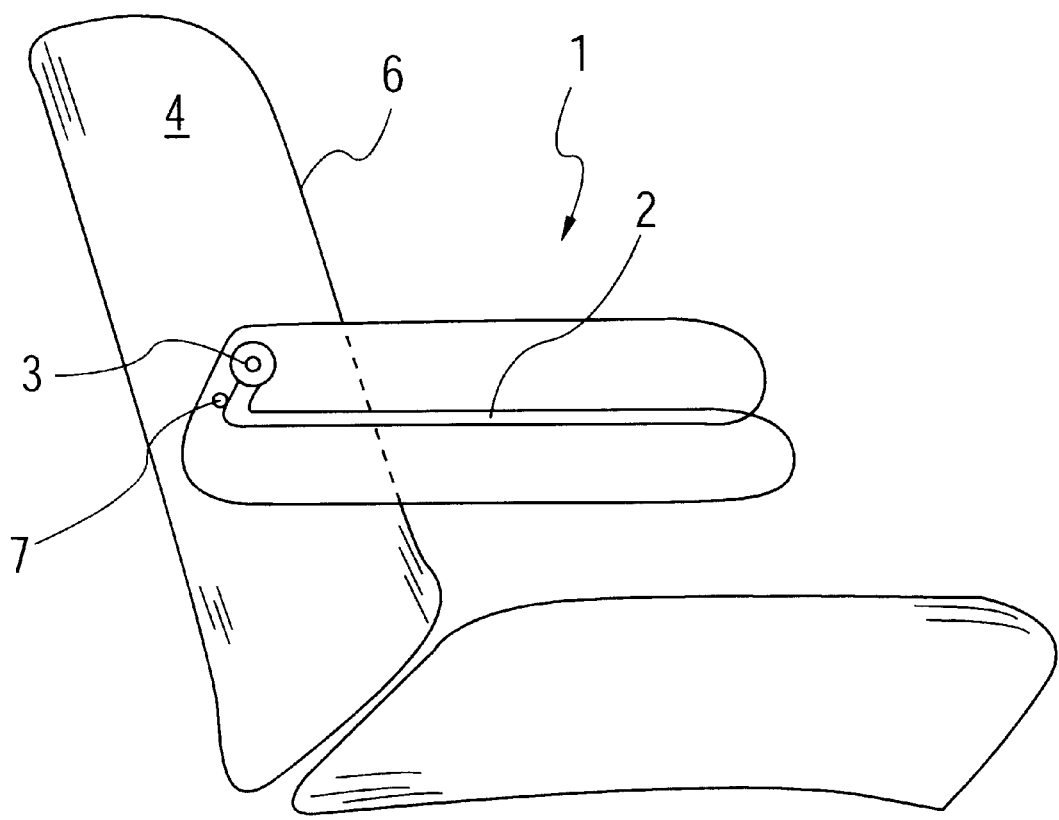
FIG. 3 is a schematic lateral view showing a first embodiment of the invention.

An alternative possibility consists in installing is shown in FIG. 3 which shows a peg 7 by way of stop for the supporting frame 2. As soon as the center armrest 1 is located in its lower, substantially horizontal position, the supporting frame 2 reaches a stop and is supported by the peg 7. By reason of the elastic material the peg 7 is deformed in the case of a limiting value that is predetermined by the geometry and by the material constants and in the process the center armrest 1 is freed for its downward movement. The peg 7 made of elastic material constitutes a releasable locking mechanism. With a view to restoring the initial position it is necessary for the center armrest to be pivoted back again by external assistance.

As a result, the implementation of the measures according to the invention permits the use of bearings of small dimensions, since by virtue of the precautions taken no overload is to be expected.

While a specific embodiment of the invention has been shown and described in detail to illustrate the application of the principles of the invention, it will be understood that the invention may be embodied otherwise without departing from such principles.

What is claimed is:

1. A backrest center armrest with resettable overload protection, the armrest comprising:

an attachment bearing attaching said armrest to the backrest so as to be capable of pivoting into a substantially horizontal position with a free end protruding outwardly from the backrest, in the region of said associated backrest; and a supporting frame including a core with at least two elements spaced from one another and an elastic linkage disposed between said at least two elements said elastic linkage allowing said free end to move under the application of a load to said armrest and restoring a position of said armrest when the load is removed.

2. The center armrest according to claim 1, wherein said elastic linkage is a spring including one of a leaf spring, spiral spring or machine spring.

3. The center armrest according to claim 1, wherein said elastic linkage is one of a core or a sleeve made of elastic synthetic material.

4. The center armrest according to claim 1 wherein said elastic linkage is disposed in a region of a front surface of the backrest.

5. A center armrest arrangement, the armrest arrangement comprising:

a backrest;

an armrest with a free end and an attachment end and having a supporting frame including a core with at least two elements spaced from one another in an arm rest length direction and an elastic linkage disposed between said at least two elements said elastic linkage allowing said free end to move relative to said attachment end, under the application of a load to said armrest, and restoring a position of said armrest when the load is removed; and an attachment bearing for attachment of said armrest attachment end to said backrest for pivoting said armrest into a substantially horizontal position with said free end protruding outwardly from said backrest.

6. The center armrest arrangement according to claim 5, wherein said elastic linkage is a spring including one of a leaf spring, spiral spring or machine spring.

7. The center armrest arrangement according to claim 5, wherein said elastic linkage is one of a core or a sleeve made of elastic synthetic material.

8. The center armrest arrangement according to claim 5, wherein said elastic linkage is disposed in a region of a front surface of the backrest.

9. A backrest and center armrest combination, the combination comprising:

a backrest;

an armrest with a free end and an attachment end and having a supporting frame including a core with a first support element adjacent to said attachment end and a second support element adjacent to said free end, said first support element being spaced from said second support element in an armrest length direction and an elastic linkage having one end connected to said first support element and having another end connected to said second support element, said elastic linkage extending in said armrest length direction and being disposed between said first support element and said second support element, said elastic linkage allowing said free end to move relative to said attachment end, under the application of a load to said armrest, with said second support element moving relative to said first support element and said elastic linkage providing a resilient restoring force for restoring a position of said armrest free end when the load is removed and restoring a position of said second support element relative to said first support element; and an attachment bearing connected to said first support element, said attachment bearing attaching said armrest attachment end to said backrest for pivoting said armrest relative to said backrest.

10. The center armrest arrangement according to claim 9, wherein said elastic linkage is a spring including one of a leaf spring, spiral spring or machine spring.

11. The center armrest arrangement according to claim 9, wherein said elastic linkage is one of a core or a sleeve made of elastic synthetic material.

12. The center armrest arrangement according to claim 9, wherein said elastic linkage is disposed in a region of a front surface of the backrest.

* * * * *